United States Patent
Robles-Kelly

(10) Patent No.: US 10,580,170 B2
(45) Date of Patent: Mar. 3, 2020

(54) SPECTRAL RECONSTRUCTION

(71) Applicant: National ICT Australia Limited, Eveleigh, NSW (AU)

(72) Inventor: Antonio Robles-Kelly, Eveleigh (AU)

(73) Assignee: National ICT Australia Limited, Eveleigh, NSW (AU)

(*) Notice: Subject to any disclaimer, the term of this patent is extended or adjusted under 35 U.S.C. 154(b) by 141 days.

(21) Appl. No.: 15/768,107

(22) PCT Filed: Oct. 6, 2016

(86) PCT No.: PCT/AU2016/050936
§ 371 (c)(1),
(2) Date: Apr. 13, 2018

(87) PCT Pub. No.: WO2017/066825
PCT Pub. Date: Apr. 27, 2017

(65) Prior Publication Data
US 2018/0308260 A1      Oct. 25, 2018

(30) Foreign Application Priority Data
Oct. 19, 2015   (AU) ................................ 2015904288

(51) Int. Cl.
*G06K 9/62*       (2006.01)
*G06T 11/00*     (2006.01)
(Continued)

(52) U.S. Cl.
CPC ........... *G06T 11/003* (2013.01); *G01J 3/0229* (2013.01); *G01J 3/28* (2013.01); *G01J 3/2803* (2013.01);
(Continued)

(58) Field of Classification Search
CPC .............. G06T 11/003; G06T 1/0007; G06T 2207/20081; G01J 3/28; G01J 3/2823;
(Continued)

(56) References Cited

U.S. PATENT DOCUMENTS

| | | |
|---|---|---|
| 2012/0307116 A1* | 12/2012 Lansel | ............... H04N 9/045 |
| | | 348/273 |
| 2015/0044098 A1* | 2/2015 Smart | ................. A61B 5/0013 |
| | | 422/82.05 |

FOREIGN PATENT DOCUMENTS

CN           103390170 A        11/2013

OTHER PUBLICATIONS

Nguyen, R.M.H. et al., 'Training-Based Spectral Reconstruction from a Single RGB Image', In European Conference on Computer vision, pp. 186-201, 2014.
(Continued)

*Primary Examiner* — Phuoc Tran
(74) *Attorney, Agent, or Firm* — Kilpatrick Townsend & Stockton LLP

(57) ABSTRACT

This disclosure relates to processing colour images to reconstruct hyperspectral images from the colour images. An image processor determines an output hyperspectral image by determining for each point of the output hyperspectral image a combination of multiple hyperspectral prototype components to correspond the output hyperspectral image to the input image. Each of the multiple hyperspectral prototype components comprises multiple component values associated with respective wavelengths and each of the multiple component values is based on multiple points of training image data associated with the wavelength of that component value. Since the component values are based on multiple points of the training image, relationships between points in the training image, such as texture, can be used to reconstruct the hyperspectral image data, which leads to a more robust and more accurate reconstruction.

17 Claims, 13 Drawing Sheets

(51) Int. Cl.
*G01J 3/28* (2006.01)
*G06T 1/00* (2006.01)
*G01J 3/02* (2006.01)

(52) U.S. Cl.
CPC .......... *G01J 3/2823* (2013.01); *G06K 9/6262* (2013.01); *G06T 1/0007* (2013.01); *G01J 2003/2826* (2013.01); *G06T 2207/20081* (2013.01)

(58) Field of Classification Search
CPC .................. G01J 3/2803; G01J 3/0229; G01J 2003/2826; G06K 9/6262
See application file for complete search history.

(56) References Cited

OTHER PUBLICATIONS

Romero, J. et al., 'Linear Bases for Representation of Natural and Artificial Illuminants', Journal Optical Society of America A, 1997, vol. 14, No. 5, pp. 1007-1014.

Jaaskelainen, T. et al., 'Vector-subspace Model for Color Representation', Journal Optical Society of America A, 1990, vol. 7, No. 4, pp. 725-730.

International Search Report and Written Opinion corresponding to PCT/AU2016/050936, dated Nov. 25, 2016, eight pages.

Extended European Search Report dated Mar. 1, 2019 in European Patent Application No. 16856480.5, all pages.

Antonio Robles-Kelly: "Single Image Spectral Reconstruction for Multimedia Applications" Oct. 26-30, 2015, pp. 251-260, Brisbane, Australia.

Toygar Akgun et al: "Super-resolution reconstruction of hyperspectral", IEEE Transactions on Image Processing, vol. 14, No. 11, Nov. 11, 2005, pp. 1860-1875, Atlanta, Georgia.

Manik Varma et al: "A Statistical Approach to Texture Classification from Single Images", International Journal of Computer Vision 62 (1/2), 61-81, 2005 Netherlands.

Javed et al: "Image Texture classification using textons", National University of Sciences and Technology, pp. 1-5, Sep. 1, 2011.

* cited by examiner

Algorithm 1 Training

---

Require: $\mathcal{I}$: Dataset of training hyperspectral images with the illuminant removed 1: for Every image in $\mathcal{I}$ do
2:    for Every pixel $u$ in the image do
3:       Compute the image intensity $g(u) = |I(u, \cdot)|_2$
4:    end for
5:    Compute the convolutional features using the image intensities
6:    for Every pixel $u$ in the image do
7:       Construct $\gamma(u)$ making use of Equation 6.
8:    end for
9: end for
10: Compute $\Phi$ by solving Equation 8
11: for Every prototype $\phi$ in $\Phi$ do
12:    Recover the spectral and convolutional components so as to satisfy Equation 9.
13: end for
14: return Set of spectral components of $\Phi$ and set $X$ of convolutional components of $\Phi$.

Algorithm 2 Testing

Require: Input colour image, set of spectral components of $\Phi$, set $X$ of convolutional components of $\Phi$, spectral sensitivity functions $Q_c(\cdot)$ for the sensor used to acquire the testing image 1: White balance the input image
2: for Every $\phi \in \Phi$ in the prototype set do
3:     Compute the chromaticity values using Equation 1.
4:     Construct the vector $\omega$ using Equation 15.
5: end for
6: for Every pixel $v$ in the input image do
7:     Compute the chromaticity values using Equation 4
8:     Compute the image intensity $g(v)$
9: end for
10: Compute the convolutional features using the image intensities
11: for Every pixel $v$ in the input image do
12:     Construct the vector $\beta(v)$ as per Equation 13.
13:     Recover the weight vector $\rho(v)$ by solving the optimisation problem in Equation 14.
14:     Compute the spectrum $R(v,\cdot)$ using Equation 10.
15: end for
16: Compute the illuminant power spectrum by solving the optimisation in Equation 16
17: return The reconstructed spectra and the illuminant power spectrum for the testing image

Fig. 13

SPECTRAL RECONSTRUCTION

CROSS-REFERENCE TO RELATED APPLICATIONS

The present application claims priority from Australian Provisional Patent Application No 2015904288 filed on 19 Oct. 2015, the content of which is incorporated herein by reference.

TECHNICAL FIELD

The disclosure concerns processing of electronic images, such as colour images. In particular the invention concerns, but is not limited to, methods, software and computer systems for processing colour images to reconstruct hyperspectral images from the colour images.

BACKGROUND ART

Imaging spectroscopy relies on associating each pixel in the image with a spectrum representing the intensity at each wavelength. As a result, imaging spectroscopy provides an information-rich representation of the scene which combines spatial and compositional information which can be used for a wide variety of applications spanning from remote sensing to food security and health.

For spectral image classification, each pixel spectra can be viewed as an input vector in a high dimensional space. This treatment opens up the possibility of representing a scene in terms of a number of spectral prototypes which correspond to naturally occurring materials such as wood, paint, etc. These materials can be extracted from the scene and are, in general, unknown a priori. Moreover, these material prototypes should be consistent across pixels sharing similar spectra. Prototypes may also be referred to as 'prototype components' to emphasise the fact that it is data structures stored or processed on computer hardware that represents the prototypes.

FIG. 1 illustrates a transformation 100 of first and second pixel radiance spectra 110 and 120 respectively, into a spectral space 130. The first pixel radiance spectrum 110 is sampled at two wavelengths $\lambda_1$ and $\lambda_2$. This results in radiance values 111 and 112. The radiance values 111 and 112 of the first pixel are represented by a first sample 131 in the two-dimensional spectral space 130.

Similarly, the second pixel radiance spectrum 120 is sampled at the same two wavelengths $\lambda_1$ and $\lambda_2$ resulting in radiance values 121 and 122, which are represented by a second sample 132 in the spectral space 130. In this way, the radiance spectra of many pixels can be represented in the same spectral space 130.

Multimedia, computer vision, video and graphics, rely upon cameras and rendering contexts to capture and reproduce colour image data. Furthermore, the accurate reproduction and capture of the scene colour across different devices is an important and active area of research spanning camera simulation, sensor design and white balancing.

The manner in which colour data is presented to the user is important for multimedia applications since the imagery is often delivered to the user based upon a rendering intent, i.e. colorimetric, perceptual, etc., which can determine the processing to be undertaken or the display medium.

Note that, even when the camera has been radiometrically calibrated, the image raw colour values are sensor specific. Moreover, raw-to-raw colour mappings between cameras are generally limited to linear transformations. The problem here stems from the fact that, in practice, cameras often do not abide to the Luther condition, i.e. the camera spectral sensitivity functions are a linear transformation of the CIE colour matching functions. This induces a non-linear transformation between camera colour spaces which depends on both, the spectral sensitivity functions and the image irradiance.

It is noted that in most applications the radiance spectra are sampled at far more points, such as one hundred. In fact, the sample wavelengths may be the same as the wavelengths of the hyperspectral image data. As a result, the sample space 130 is high-dimensional—one dimension for each wavelength.

While sampling the image spectrum at a large number of wavelengths opens useful applications, many cameras only sample three channels, such as RGB and as a result, the use of such image data is limited when compared to hyperspectral cameras.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

A method for processing an input image comprises:
  determining an output hyperspectral image by determining for each point of the output hyperspectral image a combination of multiple hyperspectral prototype components to correspond the output hyperspectral image to the input image;
  wherein
  each of the multiple hyperspectral prototype components comprise multiple component values associated with respective wavelengths; and
  each of the multiple component values is based on multiple points of training image data associated with the wavelength of that component value.

Since the component values are based on multiple points of the training image, relationships between points in the training image, such as texture, can be used to reconstruct the hyperspectral image data, which leads to a more robust and more accurate reconstruction.

The method may further comprise determining for each wavelength of the input colour image an input image value associated with that colour, wherein
  the input image value for each wavelength is based on multiple points of the input image associated with that colour,
  determining the combination comprises determining combined component values of the combination, and
  to correspond the output hyperspectral image to the input colour image comprises to correspond the combined component values to the input image values.

Each of the multiple hyperspectral prototype components may comprise multiple intensity values associated with the respective wavelengths and determining a combination of the multiple hyperspectral prototype components may comprise determining for each wavelength a weighted sum of the intensity values associated with that wavelength.

The multiple component values may be based on convolutional features. The convolutional features are based on filters.

The filters may comprise one or more of:
Leung-Malik Filter Bank;
Schmidt Filter Bank; and
Maximum Response Filter Bank.

The method may further comprise performing the method based on sparse coding.

The sparse coding may comprise constraint sparse coding.

The method may further comprise determining the multiple hyperspectral prototype components based on the training image data.

Determining the multiple hyperspectral prototype components may comprise optimising a cost function based on the multiple hyperspectral prototype components.

The method may further comprise determining an illuminant spectrum based on the output hyperspectral image.

The method may further comprise processing the output hyperspectral image for one or more of:
Material-specific colour rendition;
Accurate colour reproduction (white balance);
Material reflectance substitution; and
Compressive sensing.

Software, when installed on a computer, causes the computer to perform the above method.

A computer system for processing an input image comprises:
a data port to receive the input image;
a processor to determine an output hyperspectral image by determining for each point of the output hyperspectral image a combination of multiple hyperspectral prototype components to correspond the output hyperspectral image to the input image,
wherein
each of the multiple hyperspectral prototype components comprise multiple component values associated with respective wavelengths; and
each of the multiple component values is based on multiple points of training image data associated with the wavelength of that component value; and
a data store for storing the multiple hyperspectral prototype components and the output hyperspectral image.

The computer system may further comprise an image sensor to generate the input image.

The image sensor may be a three-colour sensor.

The computer system may further comprise a micromirror device to generate hyperspectral training image data with a low spatial resolution and three-colour input image data with a high spatial resolution, wherein the processor is to determine the multiple hyperspectral prototype components based on the hyperspectral training image data with the low spatial resolution.

Optional features described of any aspect of method, computer readable medium or computer system, where appropriate, similarly apply to the other aspects also described here.

An example will be described with reference to

Figure 1:
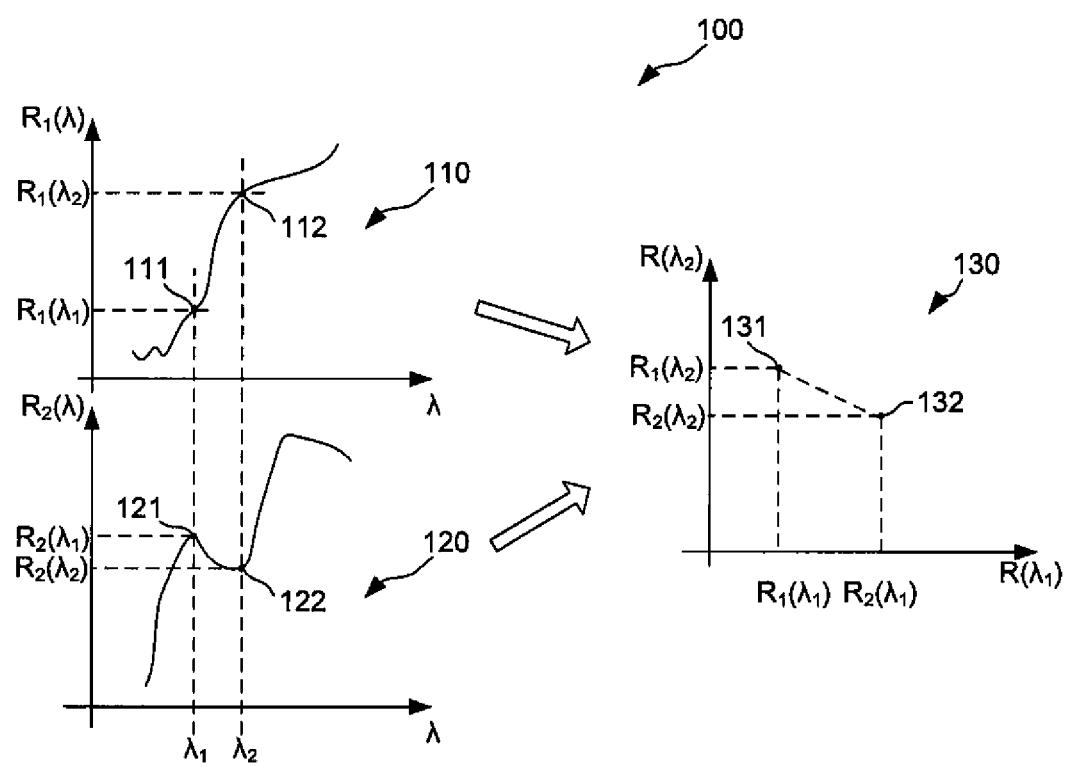
FIG. 1 illustrates a transformation of two pixel radiance spectra into a spectral space.
Figure 2:
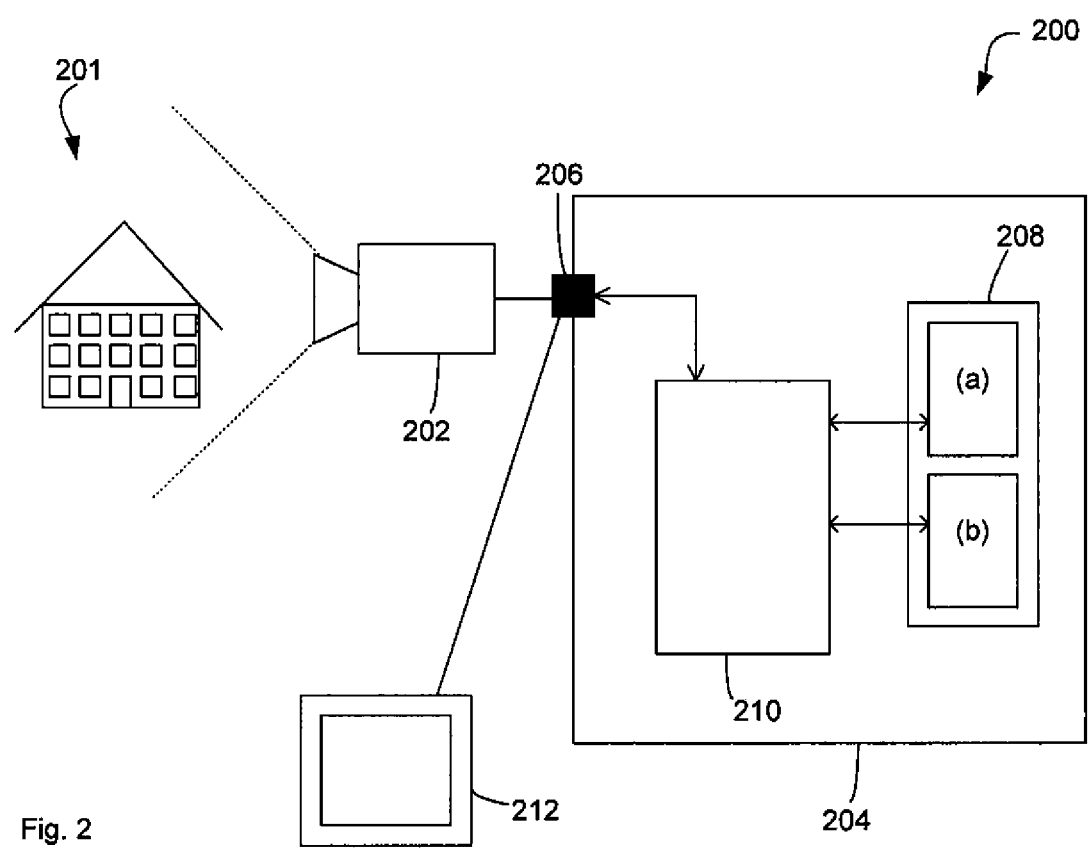

FIG. 2 illustrates a computer system for processing hyperspectral or multispectral image data.

Figure 3:
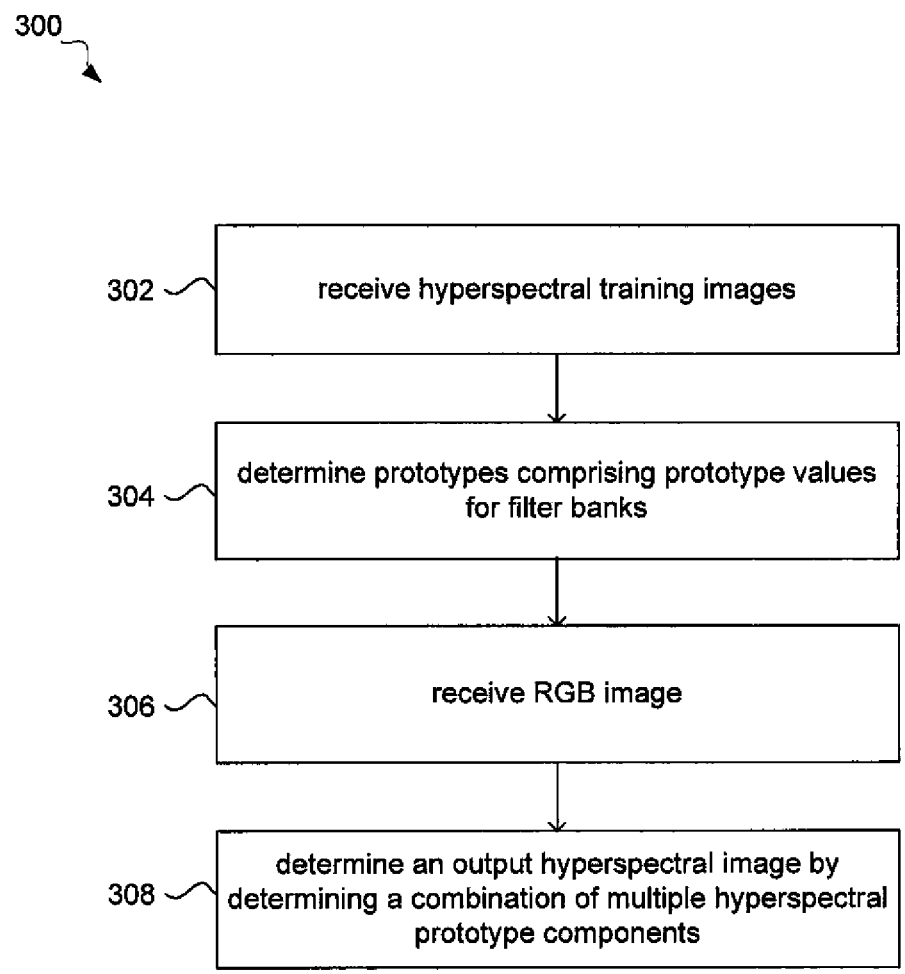

FIG. 3 illustrates a computer implemented method for processing hyperspectral or multispectral image data.

Figure 4:
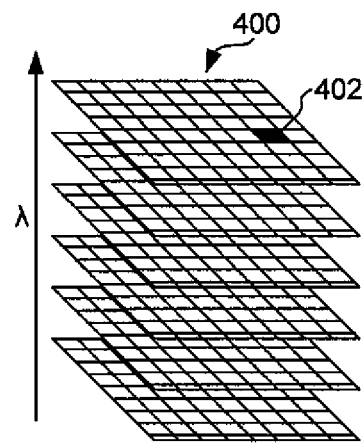

FIG. 4 illustrates a data structure for multispectral image data.

Figure 5:
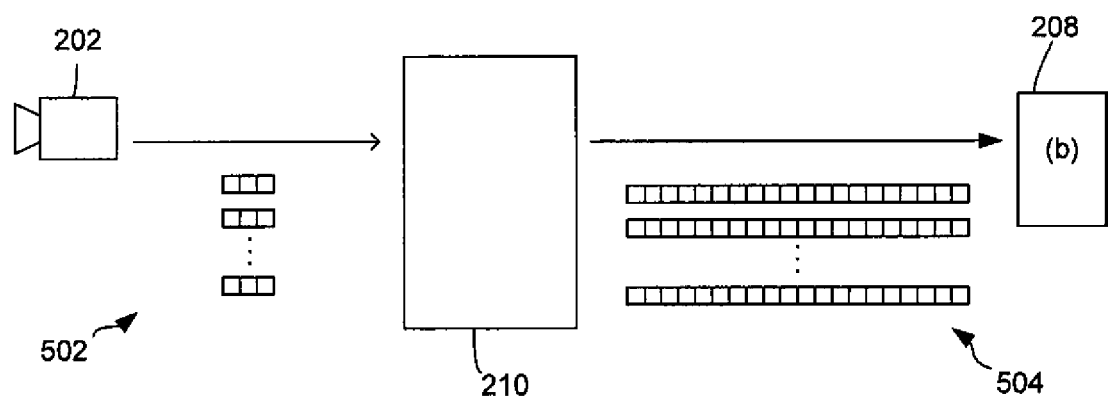

FIG. 5 illustrates an example data flow.

Figure 6:
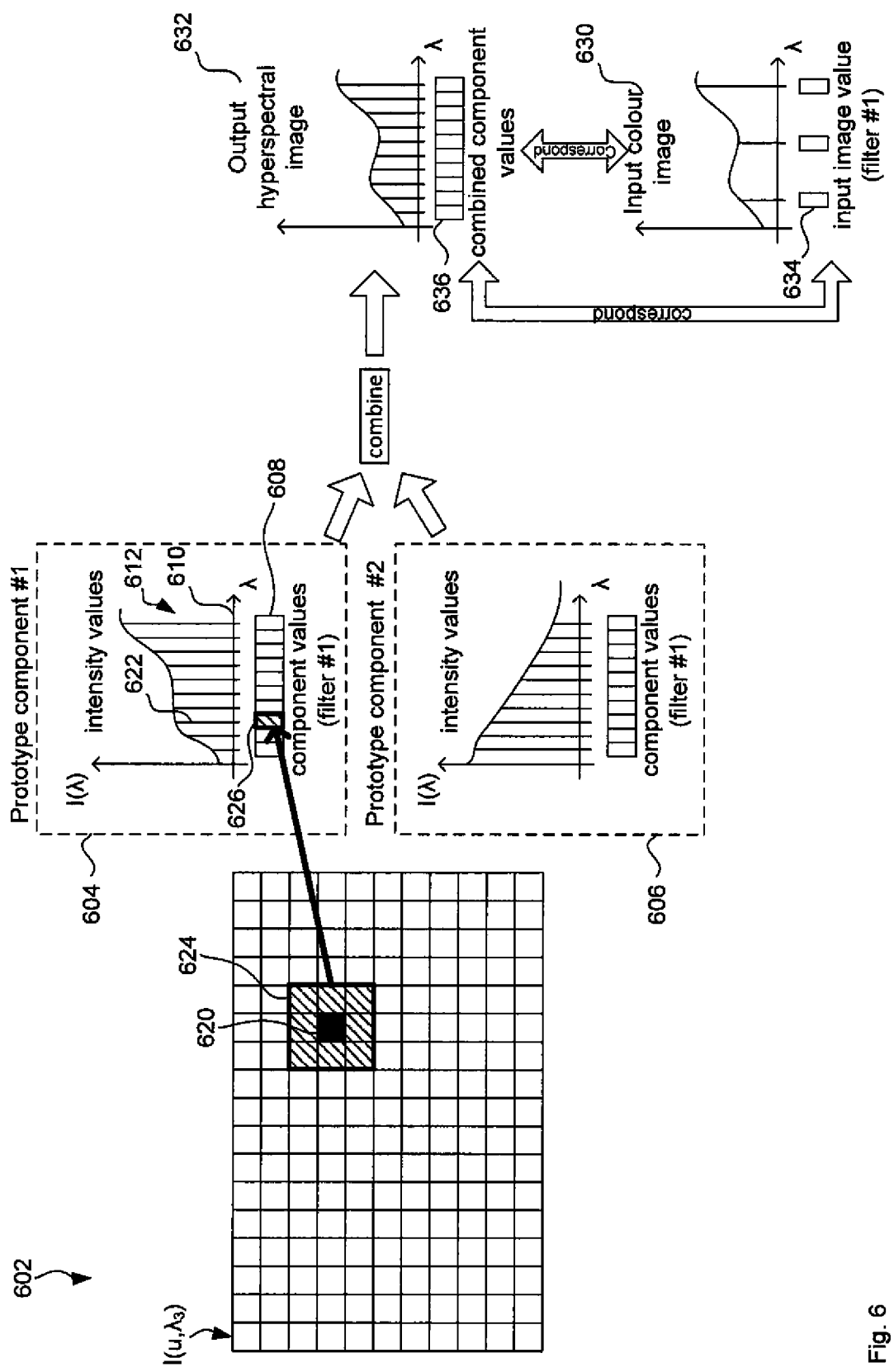

FIG. 6 illustrates the processing of example data.

Figure 7:
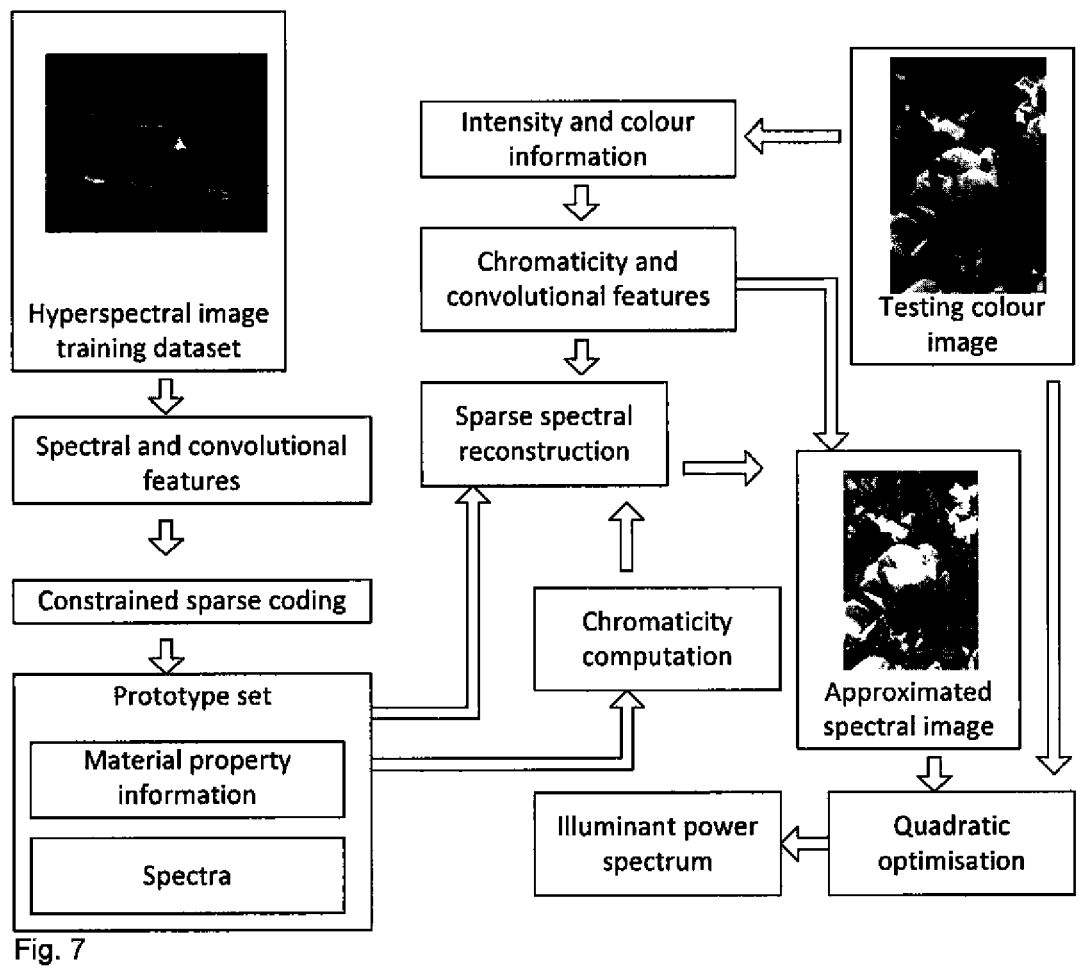

FIG. 7 illustrates the method of FIG. 3 takes at input a single colour image and recovers the spectra and illuminant making use of a training dataset.

Figure 8:
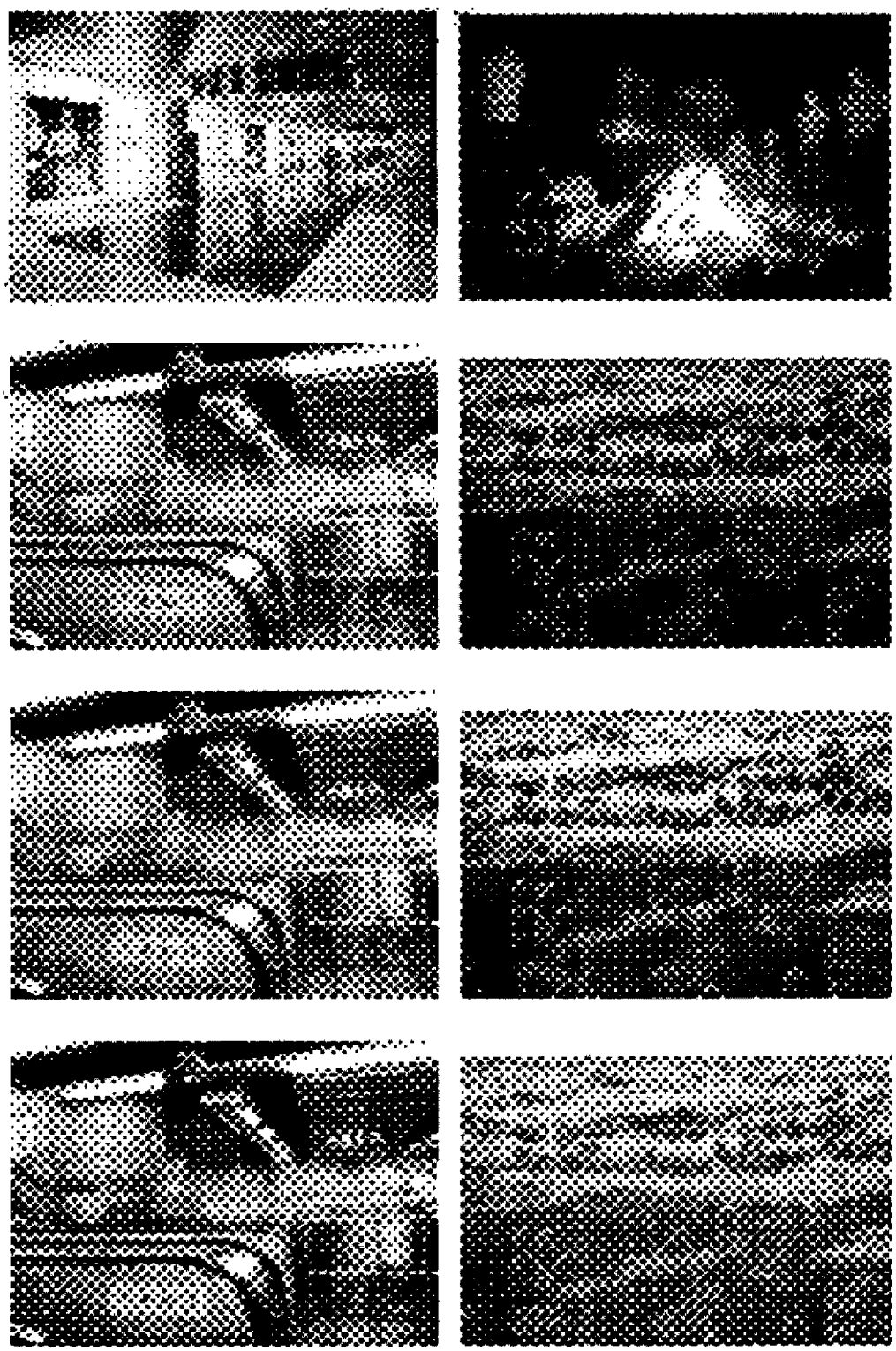

FIG. 8 illustrates illuminant transfer results. We have transferred the illuminant from the imagery in the top row to that in the second rows The third row shows the images in the second row after white balancing. The bottom two rows show the images in the second row lit by the illuminant in the top images.

Figure 9:
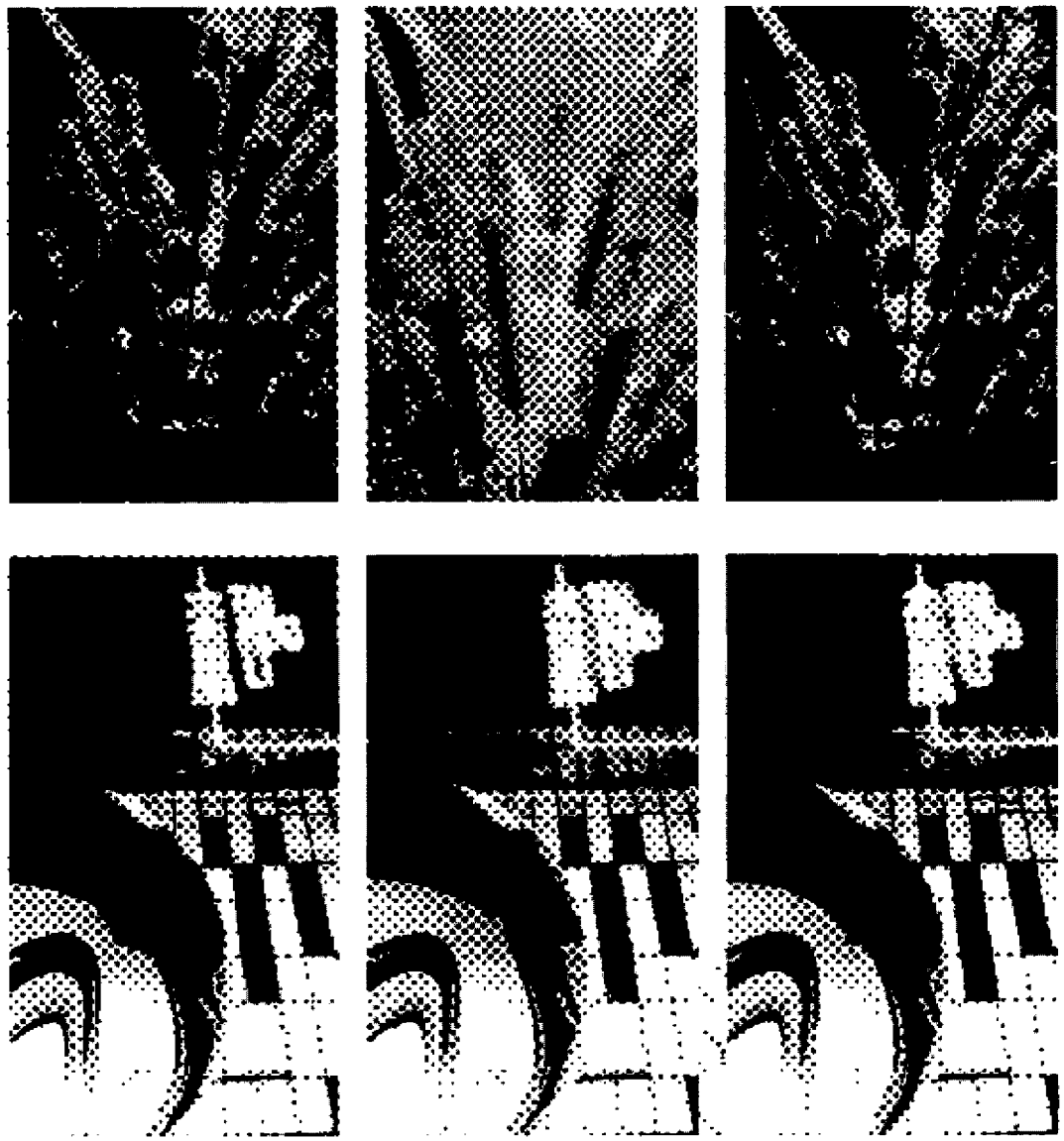

FIG. 9 illustrates illuminant substitution results. Left-hand column: Input images; Middle column: Images when the illuminant has been substituted by an incandescent light; Right-hand column: Images with the illuminant substituted by a florescent lamp.

Figure 10:
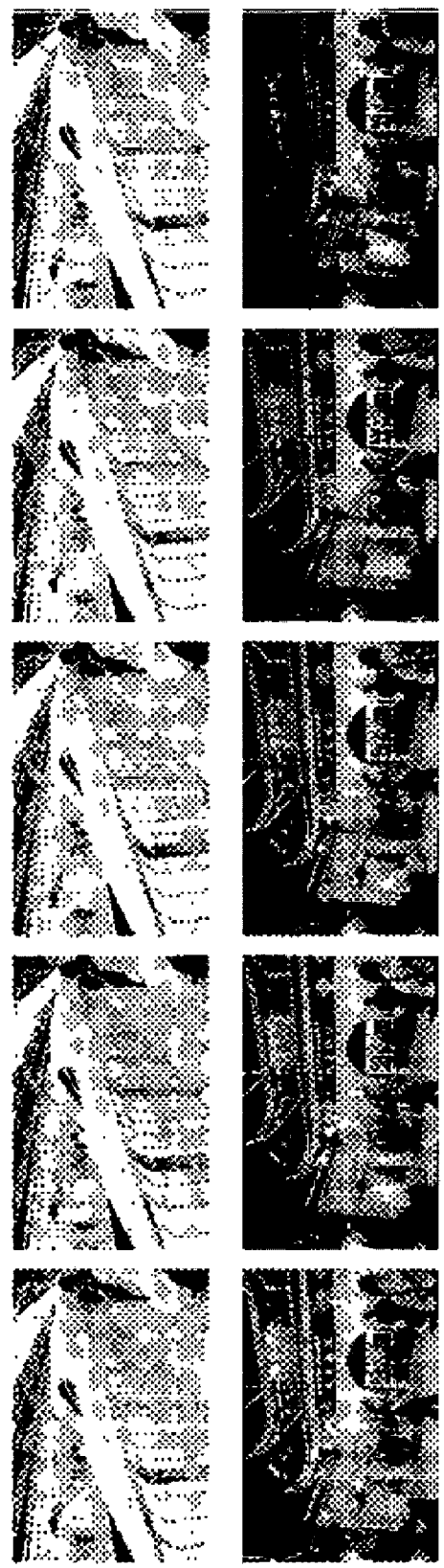

FIG. 10 illustrates film simulation results. We have performed spectral reconstruction on the images in the right-hand column and simulated three commercial films. The second column shows the white balanced images. The remaining columns show the result of applying a uniform irradiance illuminant and the spectral sensitivity functions for Fujichrome 64T Type II Professional, Kodak HD 400 and Kodak T-MAX 100, respectively.

Figure 11:
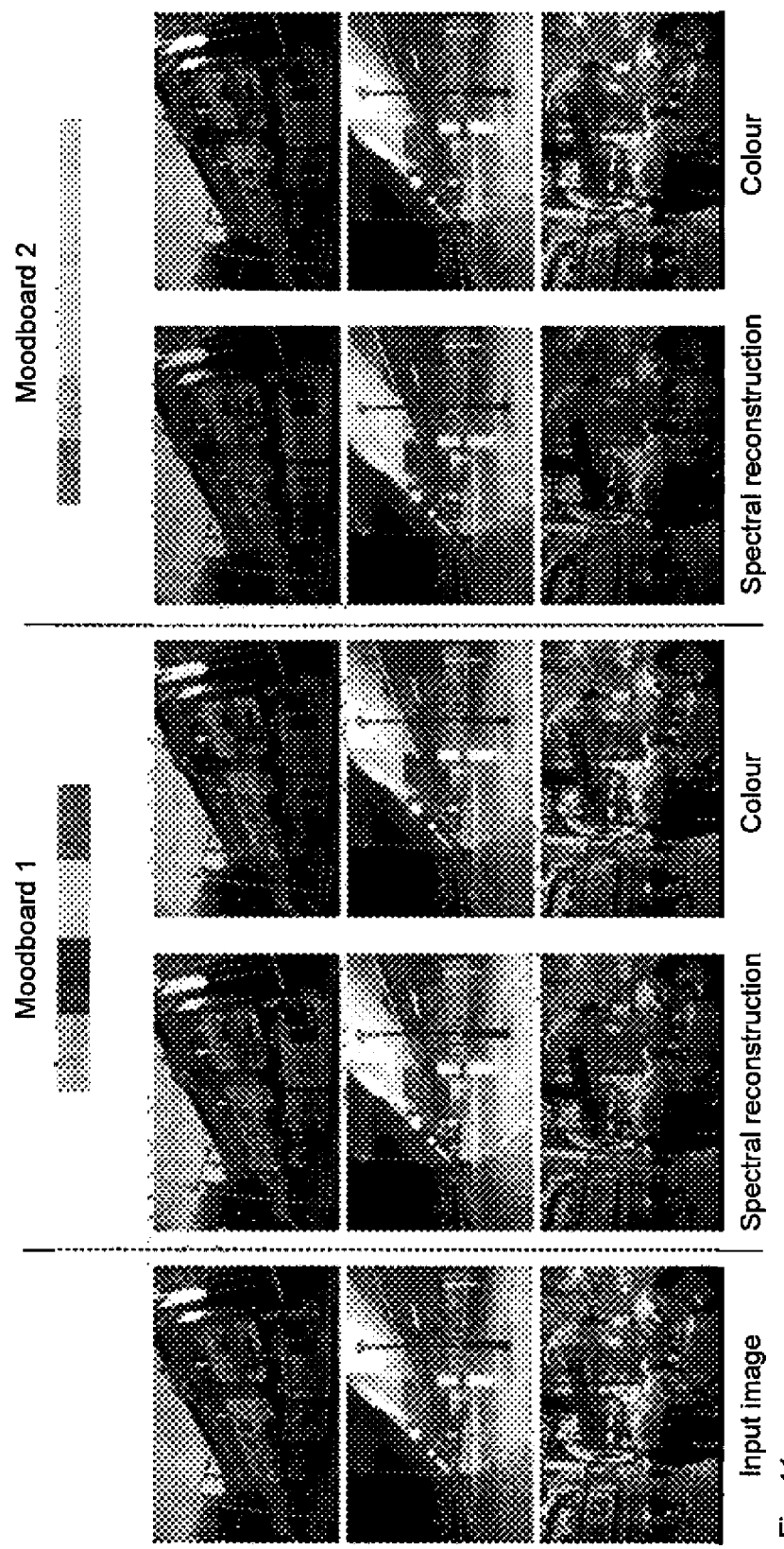

FIG. 11 illustrates mood board colour transfer results. We have performed spectral reconstruction on the images in the right-hand column and used the spectral reflectance of the mood board tiles to further decompose the scene reflectance. In the Figure, we show results for two mood board tile sets. We also show results when the unmixing is reflected in the rg-chromaticity space (\Colour" labelled columns) rather than on the spectral reconstruction.

FIG. 12 illustrates an algorithm for training.

FIG. 13 illustrates an algorithm for testing an input image.

Figure 14:
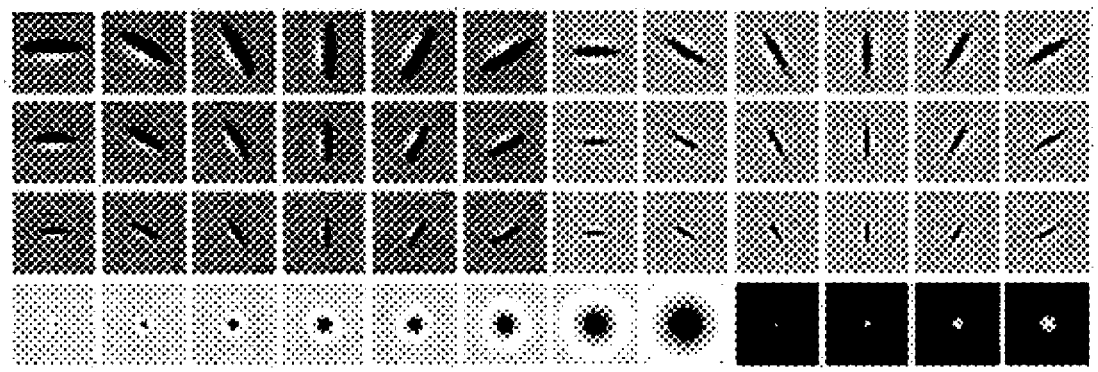

FIG. 14 illustrates the Leung-Malik (LM) Filter Bank. The LM filter bank has a mix of edge, bar and spot filters at multiple scales and orientations. It has a total of 48 filters—2 Gaussian derivative filters at 6 orientations and 3 scales, 8 Laplacian of Gaussian filters and 4 Gaussian filters.

Figure 15:
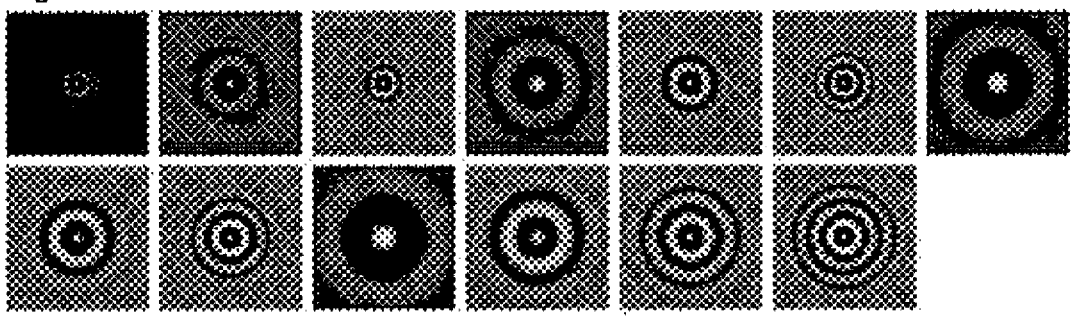

FIG. 15 illustrates the Schmid (S) Filter Bank. The S filter bank is rotationally invariant and has 13 isotropic, "Gabor-like" filters.

Figure 16:
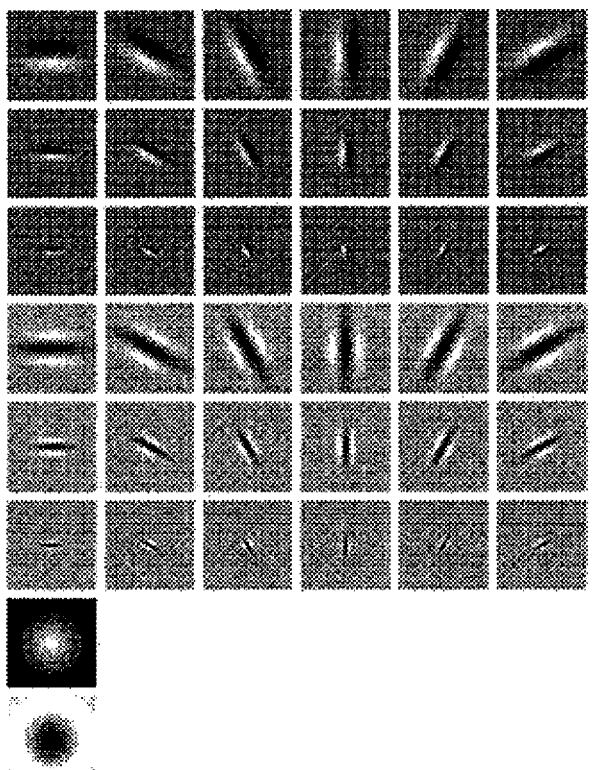

FIG. 16 illustrates the Maximum Response (MR) Filter Banks. The RFS filter bank consists of 2 anisotropic filters (an edge and a bar filter, at 6 orientations and 3 scales), and 2 rotationally symmetric ones (a Gaussian and a Laplacian of Gaussian).

BEST MODE FOR CARRYING OUT THE INVENTION

FIG. 2 illustrates a computer system 200 for processing colour images of a scene 201. Computer system 200 comprises a sensor 202 and a computer 204. In this example the sensor 202 is an RGB sensor that is able to capture an image of a scene 201.

In one example, the computer system 200 is integrated into a handheld device such as a consumer camera and the scene 201 may be any scene on the earth, such as a tourist attraction or a person. The sensor 202 may have four bands, such as red, green, blue and depth, or CMYK.

The computer 204 receives images from the sensor 202 via a data port 206 and the images are stored in local memory 208(*b*) by the processor 210. The processor 210 uses software stored in memory 208(*a*) to perform the method shown in FIG. 3. The program memory 208(*b*) is a non-transitory computer readable medium, such as a hard drive, a solid state disk or CD-ROM.

The processor 210 performs the method 300 in FIG. 3 of processing the image data received from sensor 202. Processor 210 determining an output hyperspectral image by determining for each point of the output hyperspectral image a combination of multiple hyperspectral prototype components to correspond the output hyperspectral image to the input colour.

In one example, processor 210 performs on the hyperspectral image a method for estimating an illumination spectrum of an image as described in WO 2011/026167 "Illumination Spectrum Recovery", which is incorporated herein by reference. Further, processor 210 may perform a method for decomposing hyperspectral or multispectral image data as described in U.S. Pat. No. 8,670,620 "Decomposing hyperspectral or multispectral image data", which is incorporated herein by reference. For storing the input spectra, illumination spectra or other spectra the computer may employ the method described in WO 2009/152583 "Compact Representation of a Reflectance Spectrum" which is incorporated herein by reference.

The software provides a user interface that can be presented to the user on a monitor 212. The user interface is able to accept input from the user (i.e. touch screen). The user input is provided to the input/out port 206 by the monitor 212. The image is stored in memory 208(*b*) by the processor 210. In this example the memory 208(*b*) is local to the computer 204, but alternatively could be remote to the computer 204.

The processor 210 may receive data, such as image data, from data memory 208(*b*) as well as from the communications port 206. In one example, the processor 210 receives image data from the sensor 202 via communications port 206, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 210 receives and processes the colour image data in real time. This means that the processor 210 determines the values every time the input image data is received from sensor 202 and completes this calculation before the sensor 202 sends the next input image data update. In particular, processor 210 may calculate the values for image frames of a video stream.

Although communications port 206 is shown as single entity, it is to be understood that any kind of data port may be used to receive data, such as a network connection, a memory interface, a pin of the chip package of processor 210, or logical ports, such as IP sockets or parameters of functions stored on program memory 208(*a*) and executed by processor 210. These parameters may be stored on data memory 208(*b*) and may be handled by-value or by-reference, that is, as a pointer, in the source code.

The processor 210 may receive data through all these interfaces, which includes memory access of volatile memory, such as cache or RAM, or non-volatile memory, such as an optical disk drive, hard disk drive, storage server or cloud storage. The computer system 204 may further be implemented within a cloud computing environment, such as a managed group of interconnected servers hosting a dynamic number of virtual machines.

It is to be understood that any receiving step may be preceded by the processor 210 determining or computing the data that is later received. For example, the processor 210 determines the image data, such as by filtering the raw data from sensor 202, and stores the image data in data memory 208(*b*), such as RAM or a processor register. The processor 210 then requests the data from the data memory 208(*b*), such as by providing a read signal together with a memory address. The data memory 208(*b*) provides the data as a voltage signal on a physical bit line and the processor 210 receives the image data via a memory interface.

FIG. 3 illustrates a computer implemented method 300 for processing an input colour image. FIG. 3 is to be understood as a blueprint for image processing software program, such as part of camera firmware or a processing pipeline. Method 300 may be implemented step-by-step, such that each step in FIG. 3 is represented by a function in a programming language, such as C++ or Java. The resulting source code is then compiled and stored as computer executable instructions on program memory 208(*b*).

It is noted that for most humans performing the method 300 manually, that is, without the help of a computer, would be practically impossible. Therefore, the use of a computer is part of the substance of the invention and allows performing the necessary calculations that would otherwise not be possible due to the large amount of data and the large number of calculations that are involved.

FIG. 4 illustrates a data structure 400 for the output multispectral image data. The data structure 400 comprises layers, one for each wavelength. Each layer comprises input values that are representative of the intensity associated with a wavelength index. One example pixel 402 is highlighted. The intensity values of pixel 402 associated with different wavelengths, that is the radiance input values from lower layers at the same location as pixel 402, represent a radiance spectrum also referred to as the image spectrum. This image spectrum may be a mixture of multiple illumination spectra and the reflectance spectra of different materials present in the part of the scene that is covered by pixel 402.

In the following description, the term 'pixel location' refers to an index of image data that can be mapped to a particular location of the image. A pixel location may refer to the data from an individual imaging element of sensor 202, that is, a camera pixel, or to individually addressable image elements that may be computed based on multiple camera pixels. For example, the image resolution may be reduced by combining pixels and the method 300 is performed on the low-resolution image having multiple points instead of pixels.

FIG. 5 illustrates an example data flow 500 through computer 204. Sensor 202 generates image data 502 comprising three RGB input values (columns) for each pixel location (rows). Processor 210 determines output data 504 comprising 20 output values (columns) for each pixel location (rows). Processor 210 stores 304 for each pixel location the determined values 504 on data memory 208(*b*).

Referring back to FIG. 3, processor 210 commences performing method 300 by receiving 302 hyperspectral training images. In one example, the training images have a low spatial resolution and are captured by a micro-mirror device that either captures hyperspectral image data at a low spatial resolution or RGB image data at a high spectral resolution. In another example, the training images are captured by a hyperspectral camera.

FIG. 6 illustrates the process 600 on example data. FIG. 6 shows one band of an hyperspectral training image 602. Further bands and further training images are not shown for clarity. Based on the training images, including band 602, processor 210 determines a first prototype component 604 and a second prototype component 606.

First prototype component 604 comprises multiple component values 608. These values 608 are aligned with a frequency axis 610 to indicate that each of the multiple component values 608 is associated with respective wavelengths.

Further to the component vales 608, the first hyperspectral prototype component 604 comprises multiple intensity values 612. The length of the vertical lines in FIG. 6 are indicative of each intensity value 612. The freehand curve connecting the tips of the lines is not part of the data processed by processor 210 but is provided for illustrative purposes only as it represents the real-world, non-sampled prototype spectrum. Similar to the component values, each intensity value 612 is also associated with the same wavelengths along axis 610.

It is noted that processor 210 the first prototype 604 and second prototype 606 once for all pixels. In contrast, processor 210 determines the component values 608 for each pixel. The resulting data structure may be similar to the one shown in FIG. 4 with the main difference that instead of the intensity each cell stores the component value at that pixel location and wavelength. While only a single component value is shown for each combination of wavelength and pixel location, it is noted that in most practical applications processor 210 determines multiple of such values.

As a result, in one example of a 1 Megapixel camera with 200 bands and using 50 filters and 20 prototypes, there would be 1M*200*50*20=20G component values. This large dataset can be reduce by using sparse coding as described below.

Each component value 608 is based on multiple points of training image data associated with the wavelength of that component value. FIG. 6 shows the component values for one example pixel 620 and for one example wavelength 622. In this example, processor 210 sums the intensity value for wavelength 622 of all nine neighbouring pixels as indicated by box 624. The result is example component value 626. This way component value 626 is based on multiple points of training image data associated with the wavelength of that component value. It is noted that in order to calculate the remaining component values 608 processor 210 would access different layers of the training images as shown in FIG. 4, while keeping the location of filter box 624 constant.

Determining the prototypes 604 and 606 and determining the component values 608 is part of the training phase of the proposed method.

In the testing phase, processor 210 receives 306 an input RGB image 630 and determines 308 an output hyperspectral image 632. It is noted that the input image may also be a multi-spectral image with 100 bands, for example and the output hyperspectral image has 1,000 bands. Processor 210 determines the output hyperspectral image such that it corresponds to the RGB image 630. For example, the spectrum of each pixel multiplied with the sensitivity function of the bands of the RGB sensor 202 is similar or identical to the RGB image 630.

The output hyperspectral image 632 is a combination of prototype components 604 and 606, such as a weighted sum, which means determining a combination of the multiple hyperspectral prototype components comprises determining for each wavelength a weighted sum of the intensity values associated with that wavelength. Processor 210 determines this combination for each pixel of the output hyperspectral image.

Similar to the calculation of component value 626, processor 210 calculates an input image value 634 for each colour, such as for each of R, G and B. Again, this calculation is based on multiple points of the input colour image associated with that colour. This calculation is based on the same filter mask as described above with reference to box 624. Therefore, by determining the combination output hyperspectral image 632, processor 210 also determines combined component values 636 of the combination, that is, processor 210 calculates values 636 and optimises the combination, that is, the weights of the sum, to minimise the difference between the output spectral image 632 and the input RGB image 630. This also comprises to corresponding the combined component values 636 to the input image values 634. As mentioned above, this involves the sensitivity functions that map the hyperspectral image data to the RGB image data.

Processor 210 then stores the determined hyperspectral image data on data memory 208(*b*) and may determine the illumination spectrum or remove the effect of the illumination spectrum from the hyperspectral image. After this correction for illumination spectrum, processor 210 convert the corrected output hyperspectral image back to RGB for further storage, display, print or publication.

In summary, method 300 performs spectral reconstruction and illuminant recovery from a single colour image making use of an unlabelled training set of hyperspectral images. Method 300 employs colour and appearance information to drive the reconstruction process subject to the material properties of the objects in the scene. The idea is to reconstruct the image spectral irradiance making use of a set of prototypes extracted from the training set.

These spectra, together with a set of convolutional features, such as filter 624, are hence obtained using sparse coding so as to reconstruct the image irradiance. With the reconstructed spectra in hand, processor 210 proceeds to compute the illuminant power spectrum using a quadratic optimisation approach.

Despite being a challenging task, the spectral reconstruction of the spectral irradiance from a single colour image opens up the possibility of exploiting the relationship between the scene spectral reflectance, illuminant power spectrum and sensor sensitivity functions for applications such as material-specific colour rendition, accurate colour reproduction and material reflectance substitution.

Existing spectral reconstruction approaches are eminently pixel-based, disregarding the object material properties and reconstructing the image irradiance solely based upon colour information.

Method 300 for spectral reconstruction allows images to be reproduced and presented with a look and feel in better accordance to the rendering intent. For instance, a warm or cooler feeling can be conveyed by substituting the illuminant (FIGS. 8 and 9) or more complex emotions through mood boards (FIG. 11). Moreover, method 300 is also suitable for emulation of other cameras and films (FIG. 10), which can be used to give a sense of realism, authenticity or artistic choice in multimedia settings.

We note that, by using the material properties of the objects in the image, the effects of metamers (surfaces with different spectral reflectance but identical colour) can be reduced and, hence, a better spectral reconstruction can be obtained. This hinges in the notion that the image reflectance is a photometric invariant which is intrinsic to the object material. Thus, here we employ features useful for classification and recognition in combination with a set of training images to reconstruct the spectral irradiance. Other methods for spectral reconstruction do not attempt to model the object material properties but rather reconstruct the reflectance from colour information alone.

The method presented here is quite general, making the following assumptions in some examples:
- The spectral sensitivity function of the camera used to acquire the colour image is known and may be stored on data memory 208(*b*).
- The colour image can be white balanced using existing methods.
- The scene in the colour image is illuminated by a single illuminant.
- The illuminant power spectra for the training data set is available and may be stored on data memory 208(*b*).

In FIG. 7, we show a diagram of the training and testing phases of method 300 as performed by processor 210. At training, processor 210 uses the dataset of hyperspectral images to obtain spectral and convolutional features. Processor 210 then uses these features to recover the prototype set using a constrained sparse coding approach. Since these prototypes correspond to spectral samples in the training dataset and their corresponding material properties, they can be employed at testing to reconstruct the image spectra. Finally, once the spectral reconstruction is effected, processor 210 computes the illuminant power spectrum making use of a quadratic optimisation approach.

Image Irradiance and Colour

Processor 210 employs the relationships between spectral irradiance, illuminant power spectrum, spectral sensitivity functions, colour and chromaticity. Thus, we commence by providing some useful background on these and express the image irradiance at wavelength $\lambda$ and pixel u as follows $$I(u,\lambda)=L(\lambda)R(u,\lambda) \quad (1)$$

where $L(\lambda)$ is the power spectrum of the light impinging on the object surface and $R(u,\cdot)$ is the product of the mean scattered power in the direction of the viewer and the surface reflectance spectrum.

Equation 1 is important since it permits expressing the value of the colour channel c={R,G,B} at pixel u as $$I_c(u)=\int_\Lambda L(\lambda)Q_c(\lambda)R(u,\lambda)d\lambda \quad (2)$$

where $Q_c(\lambda)$ is the spectral sensitivity function of the imager for the colour channel c and $\Lambda$ is the wavelength interval spanning the visible spectrum.

Note that, in practice, spectra is sampled in a set of n discrete wavelength indexed values $\lambda_k$. As a result, the integral above becomes a sum given by $$I_c(u) = g(u) \sum_{\lambda_k \in \Lambda} L(\lambda_k)Q_c(\lambda_k)r(u, \lambda_k) \quad (3)$$

where $g(u)=|R(u,\cdot)|_2$ is the L-2 norm of $R(u,\cdot)$ across the wavelength domain, i.e. the radiosity at pixel u, such that $R(u,\lambda)=g(u)r(u,\lambda_k)$. Note that radiosity is often called intensity in some areas of physics. This is also in good accordance with the intuitive use of the term in computer vision and image processing and, hence, we use it throughout the paper.

With the notation above, it is possible to define the colour pixel values in the rg-chromaticity space as follows $$K_c(u) = \frac{I_c(u)}{\sum_{q=(R,G,B)} I_q(u)} \quad (4)$$

-continued $$= \frac{\sum_{\lambda_k \in \Lambda} L(\lambda_k)Q_c(\lambda_k)r(u, \lambda_k)}{\sum_{q=(R,G,B)} \sum_{\lambda_k \in \Lambda} L(\lambda_k)Q_q(\lambda_k)r(u, \lambda_k)}$$

where c={R,G,B}.

Spectral Reconstruction

Note that, if a set I of training images is in hand and both, the spectral sensitivity functions and illuminant power spectra are known, for each pixel u, it becomes straightforward to compute both, the intensity g(u) and its corresponding rg-chromaticity values. This is important since intensity values may be used in computer vision to obtain textons. We follow the intuition that these textons are indicative of local object surface properties and, hence, apply the filter banks in to recover a convolutional feature for each pixel u. Our choice of a convolutional feature vector with local support follows the notion that, in this manner, object specific information is ignored so as to capture material properties devoid of the object itself.

Spectra and Convolutional Features

The use of convolutional features allows for a treatment where the image irradiance can be used to recover a set of prototypes for spectral reconstruction. Since convolutional features are related to the prototype, the actual data representing the convolutional features is referred to as component values. To see this more clearly, recall that the convolutional features/component values are computed using a set of filters. If the $i^{th}$ filter in our set is applied to the $k^{th}$ wavelength indexed band across the image lattice, we can write $$f_{i,\lambda_k}=I_{\lambda_k}*h_i=L(\lambda_k)r_{\lambda_k}o(g*h_i) \quad (5)$$

where the right-hand side of the equation follows the distributive property of the convolution.

In Equation 5, we have omitted the pixel indices as a matter of convenience ($I_{\lambda_k}\equiv I(\cdot,\lambda_k)$, $g(\cdot)\equiv g$ and $r_{\lambda_k}\equiv r(\cdot,\lambda_k)$), $h_i$ is the filter mask and, as usual, * and o indicate the convolution and Hadamard products, respectively. In other words each of the multiple component values is based on multiple points of training image data associated with the wavelength of that component value.

As a result, for each wavelength-indexed band in our training set, the spectra becomes a multiplicative constant as applied to the convolutional features computed from the image intensities. Thus, for our spectral reconstruction approach we use the vectors given by $$\gamma(u)=[r(u,\lambda_1)v\|r(u,\lambda_2)v\|K\|r(u,\lambda_N)v] \quad (6)$$

where v is a row vector whose $i^{th}$ entry corresponds to the filter response $g*h_i$ at pixel u, N is the number of wavelength-indexed bands in our training imagery and we have written $\|$ to imply vector concatenation.

The use of the vectors in Equation 6 for our reconstruction approach has two main advantages. Firstly, it permits a consistent treatment of both, our hyperspectral image training set and our colour testing image. Secondly, it allows for a constrained sparse coding scheme to be used to recover prototypes that can then be employed to perform the spectral reconstruction. This is since we can always convert the vectors $\gamma(u)$ to their rg-chromaticity analogues by extracting the values of $r(u,\cdot)$ so as to apply Equation 4. This can be done by noting that the value of $r(u,\lambda_1)$ repeats over the length of the convolutional features across the vector $\gamma(u)$.

Constrained Sparse Coding

Given a potentially large set of input patterns, sparse coding algorithms (e.g. Sparse Autoencoder) attempt to automatically find a small number of representative patterns which, when combined in the right proportions, reproduce the original input patterns. The sparse coding for the input then consists of those representative patterns.

Here, we view the problem in hand as that of representing the vectors $\gamma(u)$ using a set $\Phi$ of prototypes such that $$\gamma(u) = \sum_{\phi \in \Phi} \alpha_\phi(u)\phi \qquad (7)$$

where $\alpha_\phi(u)$ can be seen as the "abundance" of the prototype $\phi$ in $\gamma(u)$.

This treatment responds to a twofold motivation. Firstly, we exploit the fact that, in this manner, processor 210 can obtain the set of prototypes using sparse coding. Secondly, Equation 7 implies that the prototype $\phi$ should have a structure akin to that of $\gamma(u)$. This is important since the spectral and convolutional feature components in $\phi$ can then be used to reconstruct the testing image making use of its chromaticity information.

We will elaborate upon this later on. For now, we focus on the recovery of the prototype set $\Phi$. To this end, processor 210 solves the optimization problem given by $$\min_{\Phi, A} \left\{ \sum_{u \in I} |\gamma(u) - \alpha(u)^T \Phi|_2 + \tau_1 \sum_{u \in I} |\alpha(u)|_1 \right\} \qquad (8)$$

subject to $$|\alpha(u)|_2 \leq \kappa \; \forall u \in I$$

$$\alpha_\phi(u) \geq 0 \; \forall \alpha_\phi(u) \in \alpha(u)$$

where $|\cdot|_p$ denotes the p-norm, A is the set of column weight vectors $\alpha(u)$ for all the pixels in our training data, $\kappa$ is a bounding positive constant and $\tau_1$ is a scalar that accounts for the contribution of the second term in Equation 8 to the minimisation in hand.

Note that we have added the positivity constraint on the vector $\alpha(u)$ following the notion that the contributions of the primitives to the pixel spectrum correspond to an additive process. This is consistent with the notion that the weight vector entry $\alpha_\phi(u)$ can be seen as the "abundance" of the prototype $\phi$ in $\gamma(u)$. Also, we have imposed a norm constraint in order to avoid the possibility of degenerate cases involving linear transformations of $\alpha(u)$.

Reconstructing the Image Irradiance

With the prototypes in hand, we now turn our attention to the spectral reconstruction of a testing image I*. To reconstruct the spectra, processor 210 commences by computing the intensity of the testing image. With the intensity in hand, processor 210 proceeds to compute the chromaticity values $K_c(v)$, c={R,G,B} and the convolutional feature w for each pixel v in the testing image.

Recall that each of the prototypes $\phi \in \Phi$ shares its structure with that of $\gamma(u)$ as defined in Equation 6. This is as a result of the linear relationship in Equation 7 and the positivity constraint introduced in our sparse coding approach. This is important since we can write $$\phi = [s(\lambda_1)x|s(\lambda_2)x|K|s(\lambda_N)x] \qquad (9)$$

where $s(\cdot)$ can be viewed as the spectral component of $\phi$ whereas x arises from the convolutional features. In other words, each of the multiple hyperspectral prototype components $\phi \in \Phi$ comprises multiple component values x associated with respective wavelengths.

With these ingredients, processor 210 recovers the weight vector $\rho(v)$ such that the spectral reconstruction of the testing pixel v becomes $$R(v,\cdot) = g(v)\rho(v)^T S \qquad (10)$$

such that $w = \rho(v)^T X$, where X and S are matrices whose rows correspond to the vectors x and $s(\cdot)$ as defined in Equation 9 and g(v) is the intensity at pixel v. In other words $w = \rho(v)^T X$ represents a combination of multiple hyperspectral prototype components.

Thus, both, the convolutional feature w and the spectral reconstruction of the pixel v are given by the linear combination of the spectral and convolutional components of the prototypes $\phi \in \Phi$, which means determining the combination comprises determining combined component values of the combination. To determine the weight vector $\rho(v)$, we note that the relationship in Equation 10 applies also to the chromaticity values. That is, the chromaticity $K_c(v)$ of the testing pixel is given by $$K_c(v) = \rho(v)^T K_c \qquad (11)$$

where $K_c$ is a matrix whose rows correspond to the chromaticities $K_c(s)$, c={R,G,B} of the vectors $s(\cdot)$.

Thus, processor 210 constructs the vectors comprising for each wavelength of the input colour image an input image value associated with that colour:

$$\beta(v) = [K_R(v)w|K_G(v)w|K_B(v)w] \qquad (12)$$

for each of the pixels v in the testing image. It is noted that the input image value for each colour wavelength is based on multiple points of the input colour image associated with that colour, which is reflected by the convolutional feature of the input image.

Processor 210 then solves the optimisation $$\min_{\rho(v)} \{|\beta(v) - \rho(v)^T \Omega|_2 + \tau_2 |\rho(v)|_1\} \qquad (13)$$

subject to $$\rho(v)^T \Omega \geq 0 \; \forall \rho(v)_\omega \in \rho(v)$$

where $\tau_2$ is a scalar that controls the degree of sparsity in the resulting weight vector, $\Omega$ is a matrix whose rows are given by the vectors $$\omega = [K_R(s)x|K_G(s)x|K_B(s)x] \qquad (14)$$

and $\rho_\omega(v)$ is the entry of $\rho(v)$ corresponding to $\omega$. This way, processor 210 corresponds the output hyperspectral image 632 to the input image 630 by corresponding the combined component values 636 to the input image values 634.

Here, we have added the positivity constraint on the weight column vector $\rho(v)$ following the notion that the spectra cannot exhibit negative values. The vectors $\omega \in \Omega$ are analogue to the prototypes $\phi \in \Phi$ presented above. The main difference, however, is that these are defined in the rg-chromaticity space rather than the image spectral irradiance. This is not a problem, however, since the rg-chromaticity values for $s(\cdot)$ can be computed in a straightforward manner using Equation 4 if the illuminant power spectrum for the training imagery and spectral sensitivity functions for the testing image are known.

Illuminant Power Spectrum Recovery

With the spectra in hand, processor 210 can recover the illuminant power spectrum $L(\bullet)$ for the testing image I* making use of the colour information for each of the colour channels $I^*_c(\bullet)$, c={R,G,B}. Making use of Equation 3, and since the spectral sensitivity function $Q_c(\bullet)$ is known, we can solve the following non-negative optimization problem $$\min_{L(\cdot)} \left\{ \sum_{\substack{v \in I^* \\ c \in \{R,G,B\}}} \left| I^*_c(v) - \sum_{\lambda_k \in \Lambda} L(\lambda_k) Q_c(\lambda_k) R(v, \lambda_k) \right|_2 \right\} \quad (15)$$

subject to $L(\lambda_k) \geq 0$ for all $\lambda_k \in \Lambda$.

FIG. 12 shows Algorithm 1 comprising the pseudocode for the training stage of the proposed approach as stored on program memory 208(*a*) and executed by processor 210. There are a number of traits that merit further discussion. Note that the algorithm takes at input a dataset of training hyperspectral images with the illuminant removed. This is, for each of the images in the training data set, processor 210 uses $$R(u, \lambda_k) = \frac{I(u, \lambda_k)}{L(\lambda_k)} \quad (16)$$

as an alternative to the image irradiance $I(u, \lambda_k)$ at input.

This is reflected in Line 3, of Algorithm 1. We have done this since the illuminant power spectrum $L(\bullet)$ for the training images is assumed to be known and, hence, $R(u, \lambda_k)$ can be computed in a straightforward manner.

For the convolutional features, we have used the three filter banks in the following references, which are included herein by reference:

T. Leung and J. Malik. Representing and recognizing the visual appearance of materials using three dimensional textons. International Journal of Computer Vision, 43(1): 29{44, 2001.

C. Schmid. Constructing models for content-based image retrieval. In Computer Vision and Pattern Recognition, pages 39-45, 2001; and O. G. Cula and K. J. Dana. Compact representation of bidirectional texture functions. In Computer Vision and Pattern Recognition, pages I:1041-1047, 2001.

It is also worth noting that the constrained sparse coding problem in Equation 8 can be solved in a number of ways. Here, we have opted for a basis pursuit is described in R. Tibshirani. Regression shrinkage and selection via the lasso. Journal of the Royal Statistical Society, Series B, 58:267-288, 1994 (included herein by reference). where the non-negative constraint is enforced explicitly. For initialisation, we have used the mode seeking method in A. Vedaldi and S. Soatto. Quick shift and kernel methods for mode seeking. In European Conference on Computer Vision, pages 705-718, 2008. This follows the intuition that the prototypes are expected to correspond to the modes of the distribution of the vectors $\gamma(u)$ over the training images.

In Line 12 of the algorithm we recover, for each prototype, the corresponding spectral and convolutional components. This can be done via a simple division following by a normalisation step. The reason being that, for convolutional features of length M, the first M elements of $\phi$ will account for $s(\lambda_1)x$. As a result, by concatenating these N times, i.e. the number of wavelength-indexed bands in our training images, we can employ the Hadamard product and Equation 9 so as to write $$\phi \circ \zeta^{-1} = \left[ 1 \left\| \frac{s(\lambda_2)}{s(\lambda_1)} 1 \right\| K \left\| \frac{s(\lambda_N)}{s(\lambda_1)} 1 \right] \quad (17)$$

where 1 is a vector whose dimensionality is the same as the convolutional features and $\zeta$ is a vector comprised of the first M elements of $\phi$ concatenated N times.

From Equation 17 can be noted that the $i^{th}$ unique value in $\phi \circ \zeta^{-1}$ will account for the quantity $$\frac{s(\lambda_i)}{s(\lambda_1)}.$$

That is, these values are proportional to the spectral components $s(\lambda_i)$ up to the inverse of $s(\lambda_1)$. At this point, we also note that, by definition, $r(u,\bullet)$ is normalised to unity. Hence, it follows that, once the values $$\frac{s(\lambda_i)}{s(\lambda_1)}$$

are in hand, they can be normalised such that $|s(\bullet)|_2 = 1$ so as to recover the spectral component of $\phi$. Once $s(\bullet)$ is computed, the convolutional component x can be retrieved using the equation $$\frac{1}{s(\lambda_1)} \zeta = [x \| x \| K \| x] \quad (18)$$

and noting that x repeats N times on the right-hand side of the expression above.

FIG. 13 illustrates Algorithm 2 stored as program code on program memory 204(*b*) and executed by processor 210, comprising the step sequence for the testing phase of the proposed method. In our code, we have also used basis pursuit for the solution of the optimisation in Equation 13. Also, in our implementation, the intensity of the testing image is given by the lightness dimension, i.e. L, of the image in the CIELab colour space. For the optimisations in Equations 8 and 13 we have set $\tau_1 = \tau_2 = 1/N$, i.e. the inverse of the number of wavelength indexed bands in our training imagery, and $\kappa = 1$.

Note that the number of variables in $L(\lambda)$ is given by the number of wavelength indexed bands comprising the spectra $R(v,\bullet)$. For N discrete wavelengths $\lambda_1$, K, $\lambda_N$, the recovered image spectra has a dimension of P×N, where P is the number of pixels in the testing image. The optimisation problem in Equation 15 is generally well-formed if there are more pixels in the image than the number of wavelength indexed channels, i.e. P≥N. As a result, the minimisation in hand can be solved using standard non-negative least squares methods.

For the experiments presented in this section, we use a number of hyperspectral image datasets of rural and urban environments for both, training and testing. For our experiments, we also use the spectral sensitivity functions for commercial camera models, spectral sensitivity functions for Fuji and Kodak film, real-world imagery acquired RAW with a Nikon D80 and Nikon D5100 cameras and reflectance and illuminant power spectra captured in house using a spectrometer.

On the hyperspectral datasets used here, the first of these is comprised by the reflectance images of 16 scenes captured by Foster et al. available at http://personalpages.manchester.ac.uk/staff/d.h.foster/. These images were acquired with a Peltier-cooled digital camera and a fast VariSpec tunable liquid-crystal filter producing a spatial resolution of 1344× 1024 pixels and a spectral resolution of 10 nm over the wavelength range [400 nm, 720 nm]. The intensity response was recorded with 12-bit precision and was linear to the image irradiance. To compute image reflectance, the illumination spectrum was obtained from a grey Munsell surface placed in the scene.

The second of our datasets is comprised of 64 images acquired using a Specim camera with a spectral resolution of 10 nm in the visible spectrum. It is worth noting that the dataset has been divided into testing and training sets. Here, all our experiments have been effected using the latter of these for training our method.

Finally, we have also employed a subset of the Scyllarus Series A dataset of spectral images downloadable at: http://www.scyllarus.com. Our subset is given by the 52 images in the full dataset which contain a Spectralon calibration target in the scene and, hence, the image reflectance can be computed from the irradiance. These images were acquired with a Liquid Crystal Tunable Filter (LCTF) tuned at intervals of 10 nm in the visible spectrum. The intensity response was recorded with a low distortion intensified 12-bit precision camera.

For our quantitative experiments and presentation of results, unless otherwise noted, we have employed the CIE colour sensitivity functions proposed by Judd. All the spectral reconstructions performed herein cover the range [400 nm, 700 nm] in 10 nm steps. Also, note that using the full set of pixels from the 40 training images is, in practice, infeasible. As a result, for our method we have used the Markov chain Monte Carlo (MCMC) sampling strategy and set the number of prototypes delivered by our sparse coding approach to 11,800. We have used k-means to obtain 16,000 reflectance samples.

Quantitative Evaluation

We commence by showing quantitative results on both, the spectral reconstruction and the illuminant recovery for our method and a number of alternatives.

For all the methods, we have used the training images provided in the NUS dataset and quantified the spectral reconstruction error using the Euclidean angle in degrees between the ground truth and the reconstructed values of R(u,•). It is worth noting, however, that the Euclidean angle and the RMS error are correlated when the spectra is normalised to unit L2-norm.

Illuminant Substitution and Transfer

Now, we turn our attention to a sample application relevant to image editing. We show how processor 210 can use the reconstructed spectra and recovered illuminant power spectrum to substitute or transfer the illuminant from one scene to another. This stems from the observation that, once the spectra R(u,•) and the illuminant power spectrum are in hand, processor 210 can recover the new image by evaluating Equation 3.

For our experiments, we have used two widely available commercial cameras. These are a Nikon D80 and a Nikon D5100. The imagery presented here has all been acquired in RAW format and, for our method, we have performed white balancing using the $2^{nd}$ order grey edge method. The spectral sensitivity functions are those in H. T. Lin, S. J. Kim, S. S usstrunk, and M. S. Brown. Revisiting radiometric calibration for color computer vision. In International Conference on Computer Vision, pages 129-136, 2011, which is incorporated herein by reference. [ ] and the training set is, again, the subset of spectral imagery taken from the NUS dataset.

In FIG. 8, we show two sets of images where the illuminant has been transferred from one on to the other. In the figure, the top row shows the images used for extracting the illuminant transferred to the imagery in the second row. The third row shows the white balanced imagery. We have included these since it can be interpreted as true "white" light. The bottom row shows the illuminant substitution results when the power spectrum of the light in the images on the top row is used to compute the colour for the ones in the second row. Note that, in the figure, the changes in the imagery on the left are quite subtle whereas those in the right-hand side are much more evident. Nonetheless, we can appreciate that the tones on the stainless steel escalator are in good accordance with the metallic surfaces in the top image and the green walls appear more yellow.

Finally, in FIG. 9, we show a set of images where the illuminant has been substituted by that of a tungsten (middle column) and fluorescent lamp (right-hand column). We have acquired the power spectrum of these light sources in house using a spectrometer equipped with an integrating sphere. Here, we also see the expected effects due to the changes in the illuminant. Note that the middle column imagery is "warmer", which is a common effect of incandescent and tungsten lamps. The right-hand panels, in the other hand, show shifts of the colour balance towards the green channel.

Film Simulation

We now turn our attention to the use of spectral sensitivity functions other than that of the sensor used to acquire the image to present the scene to the user. This can be done by setting $Q_c(\bullet)$ in Equation 3 to an alternative. This, in effect, allows for the presentation of the image to the user with the colour rendition of a completely different medium, i.e. film as compared to digital.

To illustrate the effects of doing this, in FIG. 10 we have taken two sample pictures acquired with a Nikon D80 and recovered their spectral reconstruction using our method. As done in the previous section, for all our images, we have performed white balancing using the $2^{nd}$ order grey edge method. For all the imagery, we have produced colour imagery using the spectral sensitivity function corresponding to the Fujichrome 64T Type II Professional Available at http://www.fujifilmusa.com/support/ServiceSupportProduct.do?prodcat=238599 and the Kodak HD 400 accessible at http://www.kodak.com/global/en/consumer/products/techInfo/e7013/e7013.shtml and T-MAX 100 films downloadable from http://www.kodak.com/global/en/professional/support/techPubs/f32/f32c.jhtml.

Note that, in the figure, the images produced using the Fujichrome 64T Type II Professional show a very faint greenish colour tint whereas the ones produced using the sensitivity function of the Kodak HD 400 appear to be better colour balanced. This is consistent with the Fujichrome 64T film being a tungsten film as compared to the Kodak HD 400, which is a daylight film. This is also consistent with the notion that different types of film will deliver distinctive colours with particular look and feel. In the other hand, the imagery produced using the sensitivity functions for the Kodak T-MAX 100 has a very different character as compared to the colour panels in the figure.

Mood Board Colour Transfer

Finally, we explore the use of a mood board for recolouring the image accordingly. Mood boards are collections of colours, filters or images that convey a mood or feeling. These are used by arts and media professionals as part of the creative process. Here, we have used a set of tiles from an XRite ColorChecker Digital SG to create a mood board in a manner akin to that used for Lee filters See http://www.leefilters.com/lighting/moods.html.

For each of our two mood boards, we have selected a set of tiles from the colour chart. We have then acquired the reflectance of these tiles in house with a StellarNet spectrometer and used these reflectance spectra to "unmix" the reconstructed image irradiance for three sample scenes captured with a Nikon D5100.

Spectral unmixing is used in remote sensing so as to express the relative abundance of primordial materials, i.e. end members, in multispectral or hyperspectral imagery. Thus, here, after performing our spectral reconstruction, we have applied the method in C. P. Huynh and A. Robles-Kelly. A solution of the dichromatic model for multispectral photometric invariance. International Journal of Computer Vision, 90(1):1-27, 2010. so as to recover the spectral reflectance. With the reflectance in hand, we have then used the unmixing method in J. M. P. Nascimento and J. M. B. Dias. Vertex component analysis: A fast algorithm to unmix hyperspectral data. IEEE Trans. on Geoscience and Remote Sensing, 43(4):898{910, 2005. so as to recover the abundances of the mood board spectra that account for the best linear approximation of the image reflectance, i.e. the abundances of the XRite ColorChecker tiles whose reflectance best mixes into the image spectra.

In FIG. 11, we show the results of applying the two mood boards to our input images. As in the previous section, we have used, for our approach, the $2^{nd}$ order grey edge white balancing method. Note that, in principle, the same unmixing approach can be applied in a straightforward manner to the image colour in the rg-chromaticity space. As a result, in the figure, we have also included the results yielded by the unmixing in the chromaticity space rather than in the spectral domain.

Note that the colour-based results are much more similar to one another than those yielded by our spectral reconstruction. This is due to the fact that, as a result of Grassmann's law, any value inside the simplex formed by the mood board colours on the CIE XY chromaticity diagram will be reproduced by the unmixing process. This contrasts with the spectral domain, where each of the pixel colours arises from the application of Equation 3 to the mixed spectra and, hence, it does not abide to Grassmann's law. This can be clearly appreciated in the figure, where the results yielded by our spectral reconstruction have clearly acquired the colour scheme of the corresponding mood boards.

This disclosure presents a method to perform spectral reconstruction from a single colour image making use of training data. The method presented here is based upon a set of spectral and convolutional features. This is an important trait of our approach, leveraging material appearance information to better capture the reflectance properties of objects in the training set.

We have also shown how the illuminant power spectrum can be recovered via a quadratic optimisation step. We have performed a qualitative analysis and compared against a number of alternative methods. We have also illustrated the utility of our approach for illuminant transfer and substitution, film look and feel simulation and the application of mood board colour schemes to novel imagery.

The following information and Matlab code on Filter Banks that can be used is available from the Visual Geometry Group, Department of Engineering Science, University of Oxford.

We describe the rotationally invariant MR filter sets that are used in the our algorithm for classifying textures with filter banks. We also describe two other filter sets (LM and S) that will be used in classification comparisons. The aspects of interest are the dimension of the filter space, and whether the filter set is rotationally invariant or not.

FIG. 14 illustrates the Leung-Malik (LM) Filter Bank. The LM set is a multi scale, multi orientation filter bank with 48 filters. It consists of first and second derivatives of Gaussians at 6 orientations and 3 scales making a total of 36; 8 Laplacian of Gaussian (LOG) filters; and 4 Gaussians. We consider two versions of the LM filter bank. In LM Small (LMS), the filters occur at basic scales $\sigma=\{1, \sqrt{2}, 2, 2\sqrt{2}\}$. The first and second derivative filters occur at the first three scales with an elongation factor of 3 (i.e. $\sigma_x=\sigma$ and $\sigma_y=3\sigma_x$). The Gaussians occur at the four basic scales while the 8 LOG filters occur at $\sigma$ and $3\sigma$. For LM Large (LML), the flit ers occur at the basic scales $\sigma=\{\sqrt{2}, 2, 2\sqrt{2}, 4\}$.

An example Matlab code to generate the filter bank is as follows:

```
function F=makeLMfilters
% Returns the LML filter bank of size 49x49x48 in F. To convolve an
% image I with the filter bank you can either use the matlab function
% conv2, i.e. responses(:,:,i)=conv2(I,F(:,:,i),'valid'), or use the
% Fourier transform.
    SUP=49;              % Support of the largest filter (must be odd)
    SCALEX=sqrt(2).^[1:3];   % Sigma_{x} for the oriented filters
    NORIENT=6;           % Number of orientations
    NROTINV=12;
    NBAR=length(SCALEX)*NORIENT;
    NEDGE=length(SCALEX)*NORIENT;
    NF=NBAR+NEDGE+NROTINV;
    F=zeros(SUP,SUP,NF);
    hsup=(SUP-1)/2;
    [x,y]=meshgrid([-hsup:hsup],[hsup:-1:-hsup]);
    orgpts=[x(:) y(:)]';
    count=1;
    for scale=1:length(SCALEX),
        for orient=0:NORIENT-1,
            angle=pi*orient/NORIENT;   % Not 2pi as filters have symmetry
            c=cos(angle);s=sin(angle);
            rotpts=[c -s;s c]*orgpts;
            F(:,:,count)=makefilter(SCALEX(scale),0,1,rotpts,SUP);
            F(:,:,count+NEDGE)=makefilter(SCALEX(scale),0,2,rotpts,SUP);
            count=count+1;
        end;
    end;
    count=NBAR+NEDGE+1;
    SCALES=sqrt(2).^[1:4];
    for i=1:length(SCALES),
        F(:,:,count)=normalise(fspecial('gaussian',SUP,SCALES(i)));
        F(:,:,count+1)=normalise(fspecial('log',SUP,SCALES(i)));
        F(:,:,count+2)=normalise(fspecial('log',SUP,3*SCALES(i)));
        count=count+3;
    end;
return
function f=makefilter(scale,phasex,phasey,pts,sup)
    gx=gauss1d(3*scale,0,pts(1,:),phasex);
    gy=gauss1d(scale,0,pts(2,:),phasey);
    f=normalise(reshape(gx.*gy,sup,sup));
return
function g=gauss1d(sigma,mean,x,ord)
% Function to compute gaussian derivatives of order 0 <= ord < 3
% evaluated at x.
    x=x-mean;num=x.*x;
    variance=sigma^2;
    denom=2*variance;
    g=exp(-num/denom)/(pi*denom)^0.5;
    switch ord,
```

```
case 1, g=-g.*(x/variance);
case 2, g=g.*((num-variance)/(variance^2));
end;
return
function f=normalise(f), f=f-mean(f(:)); f=f/sum(abs(f(:))); return
```

FIG. 15 illustrates the Schmid (S) Filter Bank. The S set consists of 13 rotationally invariant filters of the form $$F(r, \sigma, \tau) = F_0(\sigma, \tau) + \cos\left(\frac{\pi\tau r}{\sigma}\right)e^{-\frac{r^2}{2\sigma^2}}$$

where $F_0(\sigma,\tau)$ is added to obtain a zero DC component with the $(\sigma,\tau)$ pair taking values (2,1), (4,1), (4,2), (6,1), (6,2), (6,3), (8,1), (8,2), (8,3), (10,1), (10,2), (10,3) and (10,4). The filters are shown in FIG. 2. As can be seen all the filters have rotational symmetry.

An example Matlab code to generate the filter bank is as follows:

```
function F=makeSfilters
% Returns the S filter bank of size 49x49x13 in F. To convolve an
% image I with the filter bank you can either use the matlab function
% conv2, i.e. responses(:,:,i)=conv2(I,F(:,:,i),'valid'), or use the
% Fourier transform.
    NF=13;                    % Number of filters
    SUP=49;                   % Support of largest filter (must be
odd)
    F=zeros(SUP,SUP,NF);
    F(:,:,1)=makefilter(SUP,2,1);
    F(:,:,2)=makefilter(SUP,4,1);
    F(:,:,3)=makefilter(SUP,4,2);
    F(:,:,4)=makefilter(SUP,6,1);
    F(:,:,5)=makefilter(SUP,6,2);
    F(:,:,6)=makefilter(SUP,6,3);
    F(:,:,7)=makefilter(SUP,8,1);
    F(:,:,8)=makefilter(SUP,8,2);
    F(:,:,9)=makefilter(SUP,8,3);
    F(:,:,10)=makefilter(SUP,10,1);
    F(:,:,11)=makefilter(SUP,10,2);
    F(:,:,12)=makefilter(SUP,10,3);
    F(:,:,13)=makefilter(SUP,10,4);
return
function f=makefilter(sup,sigma,tau)
    hsup=(sup-1)/2;
    [x,y]=meshgrid([-hsup:hsup]);
    r=(x.*x+y.*y).^0.5;
    f=cos(r*(pi*tau/sigma)).*exp(-(r.*r)/(2*sigma*sigma));
    f=f-mean(f(:));           % Pre-processing: zero mean
    f=f/sum(abs(f(:)));       % Pre-processing: L_{1} normalise
return
```

FIG. 16 illustrates the Maximum Response (MR) Filter Banks. Each of the reduced MR sets is derived from a common Root Filter Set (RFS) which consists of 38 filters and is very similar to LM. The filters used in the RFS bank are a Gaussian and a Laplacian of Gaussian both with $\sigma=10$ pixels (these filters have rotational symmetry), an edge filter at 3 scales $(\sigma_x,\sigma_y)=\{(1,3), (2,6), (4,12)\}$ and a bar filter at the same 3 scales. The latter two filters are oriented and, as in LM, occur at 6 orientations at each scale. The filter bank is shown in FIG. 3.

To achieve rotational invariance, we derive the Maximum Response 8 (MR8) filter bank from RFS by recording only the maximum filter response across all orientations for the two anisotropic filters. Measuring only the maximum response across orientations reduces the number of responses from 38 (6 orientations at 3 scales for 2 oriented filters, plus 2 isotropic) to 8 (3 scales for 2 filters, plus 2 isotropic). Thus, the MR8 filter bank consists of 38 filters but only 8 filter responses.

The dimensionality of the filter response space can be reduced even further by taking the maximum over both scales and orientations. This leads to the MRS4 filter bank. In it, each of the 4 different types of filters contributes only a single response. As in MR8, the responses of the two isotropic filters (Gaussian and LOG) are recorded directly. However, for each of the anisotropic filters, the maximum response is taken over both orientations and scale again giving a single response per filter type. With proper normalisation, MRS4 is both rotation and scale invariant.

Finally, we also consider the MR4 filter bank where we only look at filters at a single scale. Thus, the MR4 filter bank is a subset of the MR8 filter bank where the oriented edge and bar filters occur at a single fixed scale $(\sigma_x,\sigma_y)=(4, 12)$.

The motivation for introducing these MR filters sets is twofold. The first is to overcome the limitations of traditional rotationally invariant filters which do not respond strongly to oriented image patches and thus do not provide good features for anisotropic textures. However, since the MR sets contain both isotropic filters as well as anisotropic filters at multiple orientations they are expected to generate good features for all types of textures. Additionally, unlike traditional rotationally invariant filters, the MR sets are also able to record the angle of maximum response. This enables us to compute higher order co-occurrence statistics on orientation and such statistics may prove useful in discriminating textures which appear to be very similar.

The second motivation arises out of a concern about the dimensionality of the filter response space. Quite apart from the extra processing and computational costs involved, the higher the dimensionality, the harder the clustering problem. In general, not only does the number of cluster centres needed to cover the space rise dramatically, so does the amount of training data required to reliably estimate each cluster centre. This is mitigated to some extent by the fact that texture features are sparse and can lie in lower dimensional subspaces. However, the presence of noise and the difficulty in finding and projecting onto these lower dimensional subspaces can counter these factors. Therefore, it is expected that the MR filter banks should generate more significant textons not only because of improved clustering in a lower dimensional space but also because rotated features are correctly mapped to the same texton.

Example Matlab code to generate the RFS filter bank is as follows:

```
function F=makeRFSfilters
% Returns the RFS filter bank of size 49x49x38 in F. The MR8, MR4 and
% MRS4 sets are all derived from this filter bank. To convolve an
% image I with the filter bank you can either use the matlab function
% conv2, i.e. responses(:,:,i)=conv2(I,F(:,:,i),'valid'), or use the
% Fourier transform.
    SUP=49;                   % Support of the largest filter (must be
odd)
    SCALEX=[1,2,4];           % Sigma_{x} for the oriented filters
    NORIENT=6;                % Number of orientations
    NROTINV=2;
    NBAR=length(SCALEX)*NORIENT;
    NEDGE=length(SCALEX)*NORIENT;
    NF=NBAR+NEDGE+NROTINV;
    F=zeros(SUP,SUP,NF);
    hsup=(SUP-1)/2;
    [x,y]=meshgrid([-hsup:hsup],[hsup:-1:-hsup]);
    orgpts=[x(:) y(:)]';
```

-continued

```
count=1;
for scale=1:length(SCALEX),
    for orient=0:NORIENT-1,
        angle=pi*orient/NORIENT;   % Not 2pi as filters have symmetry
        c=cos(angle);s=sin(angle);
        rotpts=[c -s;s c]*orgpts;
        F(:,:,count)=makefilter(SCALEX(scale),0,1,rotpts,SUP);
        F(:,:,count+NEDGE)=makefilter(SCALEX(scale),0,2,rotpts,SUP);
        count=count+1;
    end;
end;
F(:,:,NBAR+NEDGE+1)=normalise(fspecial('gaussian',SUP,10));
F(:,:,NBAR+NEDGE+2)=normalise(fspecial('log',SUP,10));
return
function f=makefilter(scale,phasex,phasey,pts,sup)
    gx=gauss1d(3*scale,0,pts(1,:),phasex);
    gy=gauss1d(scale,0,pts(2,:),phasey);
    f=normalise(reshape(gx.*gy,sup,sup));
return
function g=gauss1d(sigma,mean,x,ord)
% Function to compute gaussian derivatives of order 0 <= ord < 3
% evaluated at x.
    x=x-mean;num=x.*x;
    variance=sigma^2;
    denom=2*variance;
    g=exp(-num/denom)/sqrt(pi*denom);
    switch ord,
        case 1, g=-g.*(x/variance);
        case 2, g=g.*((num-variance)/(variance^2));
    end;
return
function f=normalise(f), f=f-mean(f(:)); f=f/sum(abs(f(:))); return
```

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for processing an input image, the method comprising:
    determining an output hyperspectral image by determining for each point of the output hyperspectral image a combination of multiple hyperspectral prototype components to correspond the output hyperspectral image to the input image;
    wherein
    each of the multiple hyperspectral prototype components comprise multiple component values associated with respective wavelengths; and
    each of the multiple component values is based on multiple points of training image data associated with the wavelength of that component value.

2. The method of claim 1, further comprising determining for each wavelength of the input colour image an input image value associated with that colour, wherein
    the input image value for each wavelength is based on multiple points of the input image associated with that colour,
    determining the combination comprises determining combined component values of the combination, and
    to correspond the output hyperspectral image to the input colour image comprises to correspond the combined component values to the input image values.

3. The method of claim 1, wherein each of the multiple hyperspectral prototype components comprise multiple intensity values associated with the respective wavelengths and determining a combination of the multiple hyperspectral prototype components comprises determining for each wavelength a weighted sum of the intensity values associated with that wavelength.

4. The method of claim 1, wherein the multiple component values are based on convolutional features.

5. The method of claim 4, wherein the convolutional features are based on filters.

6. The method of claim 5, wherein the filters comprise one or more of:
    Leung-Malik Filter Bank;
    Schmidt Filter Bank; and
    Maximum Response Filter Bank.

7. The method of claim 1, further comprising performing the method based on sparse coding.

8. The method of claim 7, wherein the sparse coding comprises constraint sparse coding.

9. The method of claim 1, further comprising determining the multiple hyperspectral prototype components based on the training image data.

10. The method of claim 9, wherein determining the multiple hyperspectral prototype components comprises optimising a cost function based on the multiple hyperspectral prototype components.

11. The method of claim 1, further comprising determining an illuminant spectrum based on the output hyperspectral image.

12. The method of claim 1, further comprising processing the output hyperspectral image for one or more of:
    Material-specific colour rendition;
    Accurate colour reproduction (white balance);
    Material reflectance substitution; and
    Compressive sensing.

13. A non-transitory computer-readable medium with program code stored thereon that, when executed by a computer causes the computer to perform the method of claim 1.

14. A computer system for processing an input image, the computer system comprising:
    a data port to receive the input image;
    a processor to determine an output hyperspectral image by determining for each point of the output hyperspectral image a combination of multiple hyperspectral prototype components to correspond the output hyperspectral image to the input image, wherein each of the multiple hyperspectral prototype components comprise multiple component values associated with respective wavelengths; and each of the multiple component values is based on multiple points of training image data associated with the wavelength of that component value; and a data store for storing the multiple hyperspectral prototype components and the output hyperspectral image.

15. The computer system of claim 14 further comprising an image sensor to generate the input image.

16. The computer system of claim 15, wherein the image sensor is a three-colour sensor.

17. The computer system of claim 15 further comprising a micro-mirror device to generate hyperspectral training image data with a low spatial resolution and three-colour input image data with a high spatial resolution, wherein the processor is to determine the multiple hyperspectral prototype components based on the hyperspectral training image data with the low spatial resolution.

* * * * *